US008807944B2

(12) United States Patent
Itzel et al.

(10) Patent No.: US 8,807,944 B2
(45) Date of Patent: Aug. 19, 2014

(54) TURBOMACHINE AIRFOIL COMPONENT AND COOLING METHOD THEREFOR

(75) Inventors: Gary Michael Itzel, Simpsonville, SC (US); Adebukola O. Benson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 899 days.

(21) Appl. No.: 12/983,400

(22) Filed: Jan. 3, 2011

(65) Prior Publication Data

US 2012/0171047 A1    Jul. 5, 2012

(51) Int. Cl.
*F01D 5/18*    (2006.01)

(52) U.S. Cl.
CPC .............. *F01D 5/18* (2013.01); *Y02T 50/676* (2013.01); *F01D 5/183* (2013.01); *F05D 2300/612* (2013.01); *Y02T 50/672* (2013.01)
USPC ................. 416/97 R; 416/96 A; 416/97 A

(58) Field of Classification Search
CPC ........... F01D 5/18; F01D 5/187; F01D 5/188; F01D 5/186; F01D 5/189; F01D 5/182; F01D 5/183; F01D 5/184
USPC ...... 415/115; 416/95, 96 R, 97 R, 97 A, 96 A
See application file for complete search history.

(56) References Cited

U.S. PATENT DOCUMENTS

| 5,577,884 | A * | 11/1996 | Mari ............................. 415/115 |
| 6,412,541 | B2 * | 7/2002 | Roesler et al. .................. 164/34 |
| 6,827,556 | B2 | 12/2004 | Simon |
| 7,488,156 | B2 * | 2/2009 | Liang .......................... 416/97 R |
| 7,500,828 | B2 * | 3/2009 | Landis ......................... 416/97 R |
| 2006/0021730 | A1* | 2/2006 | Marcin, Jr. ................. 164/122.1 |
| 2006/0251515 | A1* | 11/2006 | Landis ........................ 416/97 R |
| 2007/0274854 | A1 | 11/2007 | Kelly et al. |
| 2008/0250641 | A1 | 10/2008 | James et al. |
| 2009/0081048 | A1 | 3/2009 | Beeck et al. |
| 2010/0239409 | A1 | 9/2010 | Draper |
| 2010/0239412 | A1 | 9/2010 | Draper |

* cited by examiner

*Primary Examiner* — Ned Landrum
*Assistant Examiner* — Ryan Ellis
(74) *Attorney, Agent, or Firm* — Ernest G. Cusick; Gary M. Hartman; Domenica N. S. Hartman

(57) ABSTRACT

An airfoil component for use in a turbomachine, and method of promoting the heat transfer characteristics within the component. The component includes an airfoil portion having a span-wise direction delimited by an airfoil root and airfoil tip, and a chord-wise direction delimited by leading and trailing edges. A chamber within the airfoil portion contains a permeable foam member. The chamber is fluidically connected to a cooling fluid source and to a cooling hole through first and second passages, respectively, within the airfoil portion. The chamber is located relative to the first and second passages so as to be offset in the chord-wise direction therefrom so that cooling fluid entering the chamber through the first passage is diverted by the foam member in the chord-wise direction before exiting the airfoil portion through the cooling hole.

20 Claims, 4 Drawing Sheets

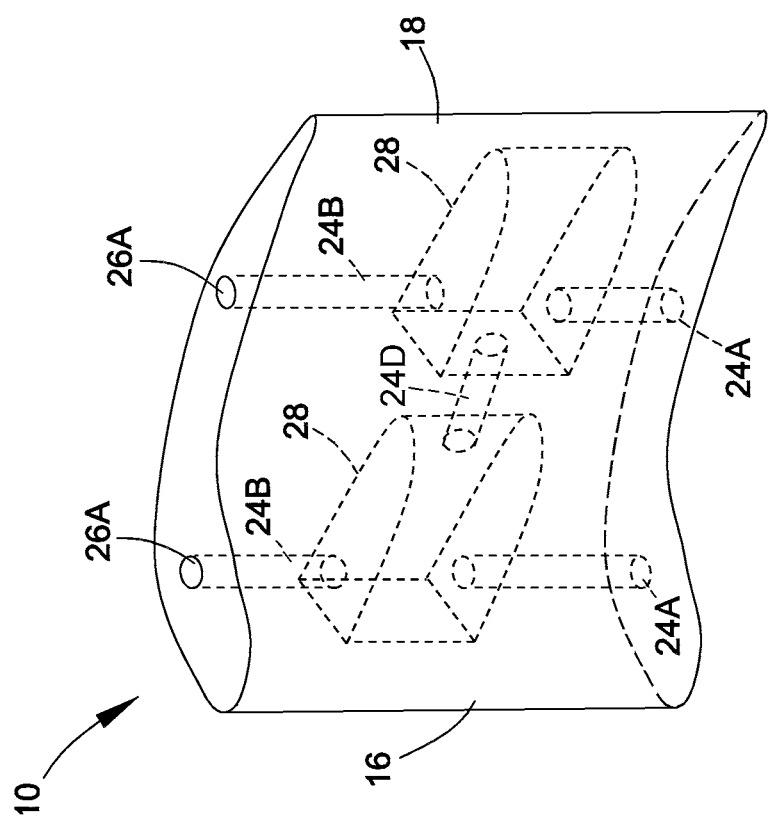

US 8,807,944 B2

TURBOMACHINE AIRFOIL COMPONENT AND COOLING METHOD THEREFOR

BACKGROUND OF THE INVENTION

The present invention relates to components that operate at high temperatures, such as turbine airfoil components of turbomachinery. More particularly, this invention relates to an airfoil component equipped with one or more internal cooling passages connected to one or more internal cooling chambers capable of promoting the heat transfer characteristics within the component.

Components of turbomachinery, such as buckets (blades), nozzles (vanes), and other hot gas path components of industrial and aircraft gas turbine engines, are typically formed of nickel, cobalt or iron-base superalloys with desirable mechanical and environmental properties for turbine operating temperatures and conditions. Because the efficiency of a turbomachine is dependent on its operating temperatures, there is a demand for components, and particularly airfoil components such as turbine buckets and nozzles, to be capable of withstanding increasingly higher temperatures. As the maximum local temperature of a superalloy component approaches the melting temperature of the superalloy, forced cooling with a suitable fluid, typically air, becomes necessary. For this reason, airfoils of gas turbine buckets and nozzles often require complex cooling schemes in which a cooling fluid, typically compressor bleed air, is forced through internal cooling passages within the airfoil and then discharged through cooling holes at the airfoil surface to transfer heat from the component. Convection cooling occurs within the airfoil from heat transfer to the cooling fluid as it flows through the cooling passages. In a technique referred to as impingement cooling, additional cooling can be achieved with fine internal orifices that direct cooling fluid directly against the inner surfaces of the outer walls of the airfoil. Cooling holes can also be configured so that cooling fluid is released into the gas path at specific locations on the component surface to provide a layer of cooling fluid flow over the component surface, creating a boundary layer (film) that reduces heat transfer from the hot gas path to the component.

Considerable cooling fluid is often required to sufficiently lower the surface temperature of an airfoil component. To promote heat transfer efficiency from the airfoil to the cooling fluid, it may be desirable or necessary to provide internal features in the internal surfaces of the cooling circuit. Such features have included ribs, turbulence promoters, crossover holes, trail edge slots, serpentine passages, etc. The inclusion of metallic foam or similar porous and permeable materials has also been proposed to promote heat transfer within airfoil components. For example, U.S. Published Patent Application Nos. 2006/0021730, 2007/0274854, 2008/0250641, 2009/0081048, 2010/0239409 and 2010/0239412 propose the use of a metallic foam or similar material to fill the interior and/or cooling holes of an airfoil, such that the airflow through the foam is largely unidirectional.

BRIEF DESCRIPTION OF THE INVENTION

The present invention provides a fluid-cooled turbomachine airfoil component adapted for use in a hot gas path of a turbomachine, and method of promoting the heat transfer characteristics within the component.

According to a first aspect of the invention, the airfoil component includes an airfoil portion having a span-wise direction delimited by a root and a tip, a chord-wise direction delimited by a leading edge and a trailing edge, and a thickness-wise direction delimited by concave and convex surfaces formed by walls that extend between the leading and trailing edges. The airfoil component further has a chamber within the airfoil portion, a porous and permeable foam member within the chamber, a first passage within the airfoil portion that is adapted to fluidically connect the chamber to a cooling fluid source, and a second passage within the airfoil portion that is adapted to fluidically connect the chamber to a first cooling hole located at a surface of the airfoil portion. According to preferred aspects of the invention, the chamber is located relative to the first and second passages so as to be offset in the chord-wise direction therefrom so that cooling fluid entering the airfoil portion through the first passage enters the chamber and is diverted by the foam member in the chord-wise direction before exiting the airfoil portion through the first cooling hole.

Another aspect of the invention is to promote cooling of an airfoil portion of a fluid-cooled turbomachine airfoil component by creating an internal chamber within the airfoil portion that is connected to a cooling fluid source and to a cooling hole located at a surface of the airfoil portion. The chamber contains a porous and permeable foam member, and the turbomachine is operated so that cooling fluid enters the chamber and is diverted by the foam member in a chord-wise direction of the airfoil portion before exiting the airfoil portion through the cooling hole.

A technical effect of the invention is the ability to significantly increasing the heat transfer efficiency of an airfoil component through the use of a foam material that not only promotes heat transfer between the component and a cooling fluid flow through the component by increasing the surface area exposed to the cooling fluid flow, but also by employing the foam material to redirect the cooling fluid flow within the component, for example, toward regions of the airfoil that tend to operate at higher temperatures.

Other aspects and advantages of this invention will be better appreciated from the following detailed description.

BRIEF DESCRIPTION OF THE DRAWINGS

FIG. 3 through 5 schematically represent perspective views of airfoil portions of turbine buckets having foam-filled internal chambers in accordance with additional embodiments of the present invention.

DETAILED DESCRIPTION OF THE INVENTION

The present invention is generally applicable to components that operate within environments characterized by relatively high temperatures, and particularly components whose maximum surface temperatures approach the melting temperature of the material from which they are formed, necessitating the use of forced cooling to reduce the component surface temperatures. Notable but nonlimiting examples of such components include airfoil components of turbomachinery, such as turbine buckets (blades) and nozzles (vanes) of industrial and aircraft gas turbine engines.

Figure 1:
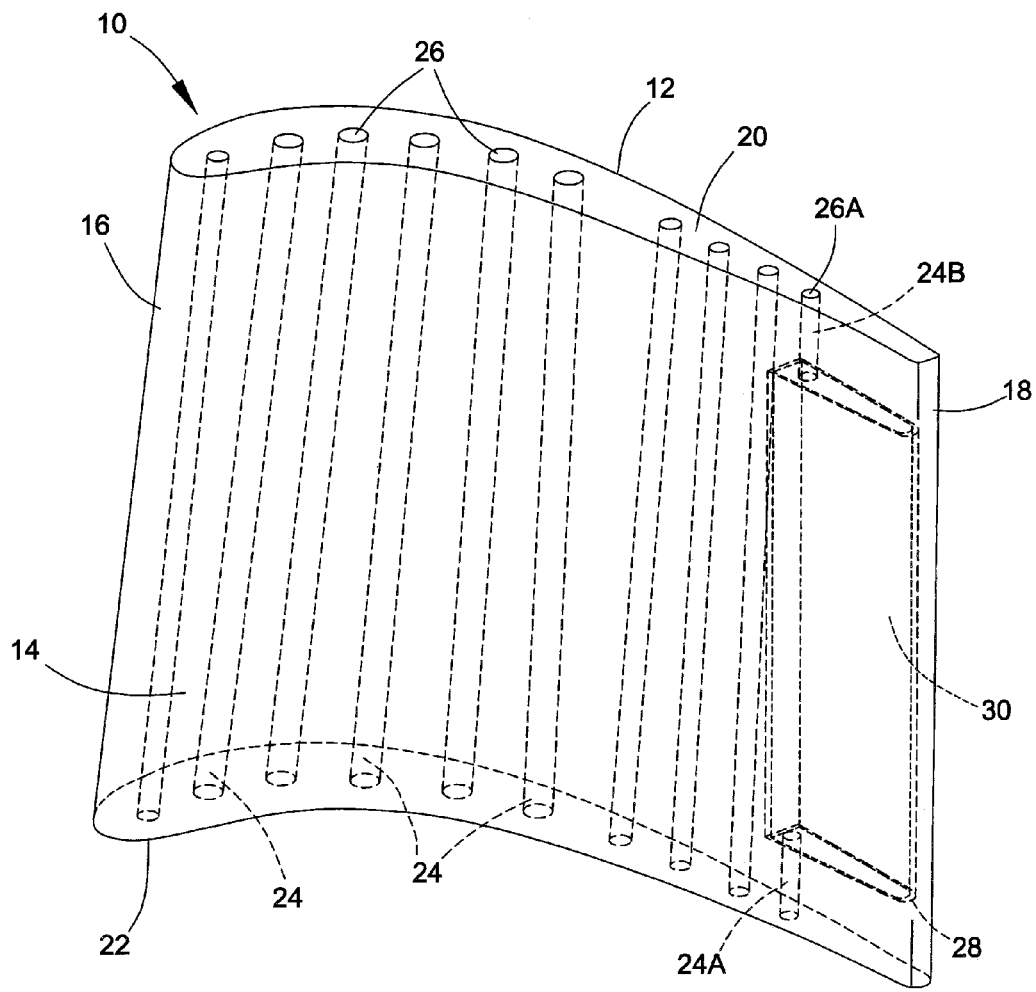
FIG. 1 is a perspective view of an airfoil portion of a turbine bucket having an internal chamber that contains a foam member in accordance with an embodiment of the present invention.

An example of an airfoil portion 10 of a turbine bucket is schematically represented in FIG. 1. As is conventional, the bucket and its airfoil portion 10 can be anchored to a turbine disk with a feature formed on a root section (not shown) of the bucket. Consistent with industry nomenclature, the airfoil portion 10 can be described as having walls that define oppositely-disposed convex and concave surfaces 12 and 14, which may be referred to as suction and pressure surfaces, respectively, in the context of a turbine bucket or blade. The walls of the airfoil portion 10 define a leading edge 16 of the airfoil portion 10 and converge to define an oppositely-disposed trailing edge 18 of the airfoil portion 10. An airfoil tip 20 is defined at the span-wise outer extremity of the airfoil portion 10, and an oppositely-disposed airfoil root 22 is defined at the span-wise inner extremity of the airfoil portion 10, which conventionally would be immediately adjacent a platform (not shown) that separates the airfoil portion 10 from the root section of the bucket. Also consistent with industry nomenclature, the airfoil portion 10 is said to have a span direction extending from the root 22 to the airfoil tip 20, a chord extending between the leading and trailing edges 16 and 18, and a thickness as measured between the convex and concave surfaces 12 and 14.

The bucket and its airfoil portion 10 may be formed of a variety of materials, including nickel-, cobalt-iron- and titanium-based alloys, as well as ceramic-based composite, for example, ceramic matrix composite (CMC) materials. Preferred materials include nickel-, cobalt- or iron-based superalloys, notable but nonlimiting examples of which include nickel-based superalloys such as GTD-111® (General Electric Co.), GTD-444® (General Electric Co.), IN-738, René N4, René N5 and René 108. The airfoil portion 10 may be formed as an equiaxed, directionally solidified (DS), or single crystal (SX) casting to withstand the high temperatures and stresses to which it is subjected within a gas turbine engine. Melting and casting processes suitable for producing the bucket and its airfoil portion 10 are well known and therefore will not be discussed here in any detail.

The external surfaces of the airfoil portion 10 are subjected to very high temperatures as a result of hot combustion gases being directed at the airfoil portion 10 during operation of a turbomachine in which the bucket is installed. For this reason, the airfoil portion 10 is represented as having internal passages 24 that extend from the root 22 to the airfoil tip 20, terminating in cooling holes 26 at the airfoil tip 20. The passages 24 receive a cooling fluid from a suitable source (not shown), such as compressor bleed air from the compressor section of the turbomachine. The cooling fluid, which enters the airfoil portion 10 through its root 22, is forced through the passages 24 to absorb heat from the airfoil portion 10, and is then discharged through the cooling holes 26 to transfer the absorbed heat from the airfoil portion 10. The passages 24 are represented as being parallel to each other and essentially cylindrical in shape, though other shapes and cross-sections are foreseeable. The passages 24 can be formed by conventional methods, for example, with cores employed in traditional investment casting methods typically used to cast airfoil components of turbomachinery. While the advantages of this invention will be described with reference to the airfoil portion 10 whose internal passages 24 are entirely separate and have straight and uniform cross-sections as shown in FIG. 1, the teachings of this invention are also applicable to more complex cooling schemes that may be implemented in hot gas path components of industrial and aircraft gas turbine engines, for example, serpentine cooling passages.

FIG. 1 further represents the airfoil portion 10 as having an internal cavity or chamber 28 connected to a pair of passages that are designated as 24A and 24B, the latter of which terminates at a cooling hole 26A located at the tip 20 of the airfoil portion 10. Similar to the passages 24, the passage (inlet passage) 24A is fluidically connected to a source of cooling fluid, such that the passage 24A supplies the chamber 28 with the cooling fluid, which subsequently exits the chamber 28 through the passage (outlet passage) 24B before being discharged from the airfoil portion 10 through the cooling hole 26A. The inlet passage 24A is represented as fluidically connected to the chamber 28 at a span-wise extent of the chamber 28 closest to the airfoil root 22, and the outlet passage 24B is represented as fluidically connected to the chamber 28 at a span-wise extent of the chamber 28 closest to the airfoil tip 20.

The passages 24A and 24B and the internal chamber 28 are represented as being disposed at the trailing edge 18 of the airfoil portion 10 between its convex and concave surfaces 12 and 14, such that the passages 24A and 24B are closer to the trailing edge 18 than the other passages 24 within the airfoil portion 10. The passages 24A and 24B are represented in FIG. 1 as being roughly equal in diameter and axially aligned, the passages 24A and 24B of different cross-sectional sizes and shapes are foreseeable. The chamber 28 is represented as approximately centered in the span-wise direction of the airfoil portion 10 and spaced apart from the airfoil tip 20 and root 22. FIG. 1 further represents the chamber 28 as having a roughly rectilinear shape, such that its chord-wise width, thickness-wise width and its span-wise length are roughly constant, though this is not a requirement and irregular-shaped chambers 28 are also within the scope of the invention. In the nonlimiting example of FIG. 1, the chamber 28 has a span-wise length of about 70% to about 75% of the total span-wise length of the airfoil portion 10, and a chord-wise width of about 20% to about 30% of the total chord-wise width of the airfoil portion 10. It is believed the chamber 28 may have a span-wise length of about 15% to about 75% of the total span-wise length of the airfoil portion 10, and a chord-wise width of about 4% to about 96% of the total chord-wise width of the airfoil portion 10. Greater span-wise lengths and chord-wise widths are limited by structural considerations, whereas lesser span-wise lengths and chord-wise widths are permitted depending on the cooling requirements of the airfoil portion 10.

As evident from FIG. 1, the chamber 28 is considerably wider than the passages 24A and 24B in the chord-wise direction. Furthermore, the chamber 28 is shown as being offset from the passages 24A and 24B toward the trailing edge 18 of the airfoil portion 10, such that the chamber 28 is closer than the passages 24A and 24B to the trailing edge 18. Certain benefits are believed to arise from the configuration shown in FIG. 1, particularly in terms of cooling the surfaces 12 and 14 of the airfoil portion 10 immediately adjacent the trailing edge 18. However, it should be understood that the invention is not limited to this particular configuration. For example, the chamber 28 could be located within the airfoil portion 10 other than adjacent the trailing edge 18. Furthermore, though the chamber 28 is represented as being fluidically coupled to a single inlet passage 24A and a single outlet passage 24B, any number of inlet and outlet passages 24A and 24B could be employed. Additional configurations relating to the number and locations of the chamber 28 will be discussed below in reference to FIGS. 3 through 5.

The chamber 28 is depicted as containing a porous and permeable material, referred to herein as a foam member 30. The chamber 28 is preferably completely filled with the foam member 30, such that the foam member 30 is in intimate and continuous contact with all of the interior wall surfaces of the chamber 28. Due to its porous and permeable nature, the foam member 30 is permeated by cooling fluid that fills the chamber 28 from the passage 24A, and the interconnected pore spaces of the foam member 30 allow the cooling fluid to circulate within the chamber 28 before exiting through the passage 24B. In this manner, the foam member 30 significantly increases the surface area contacted by the cooling fluid adjacent the trailing edge 30, with the result that the heat transfer efficiency from the trailing edge 18 and adjacent portions of the convex and concave surfaces 12 and 14 to the cooling fluid is greatly enhanced.

The efficacy of the foam member 30 can be promoted by forming the foam member 30 of a thermally-conductive material, such as a metallic material. Because the foam member 30 is exposed to the cooling fluid within the chamber 28 as well as elevated temperatures resulting from heat transfer from the airfoil portion 10, preferred materials for the foam member 30 are high-temperature oxidation-resistant alloys such as a nickel-, cobalt- and iron-based alloys, notable but nonlimiting examples of which include FeCrAlY alloys of types known in the art. By properly selecting its material, the foam member 30 can be incorporated into the airfoil portion 10 during the casting process used to form the bucket. For example, the foam member 30 can be incorporated into the bucket casting using a casting technique of the type reported in U.S. Published Patent Application No. 2007/0274854.

Figure 2:
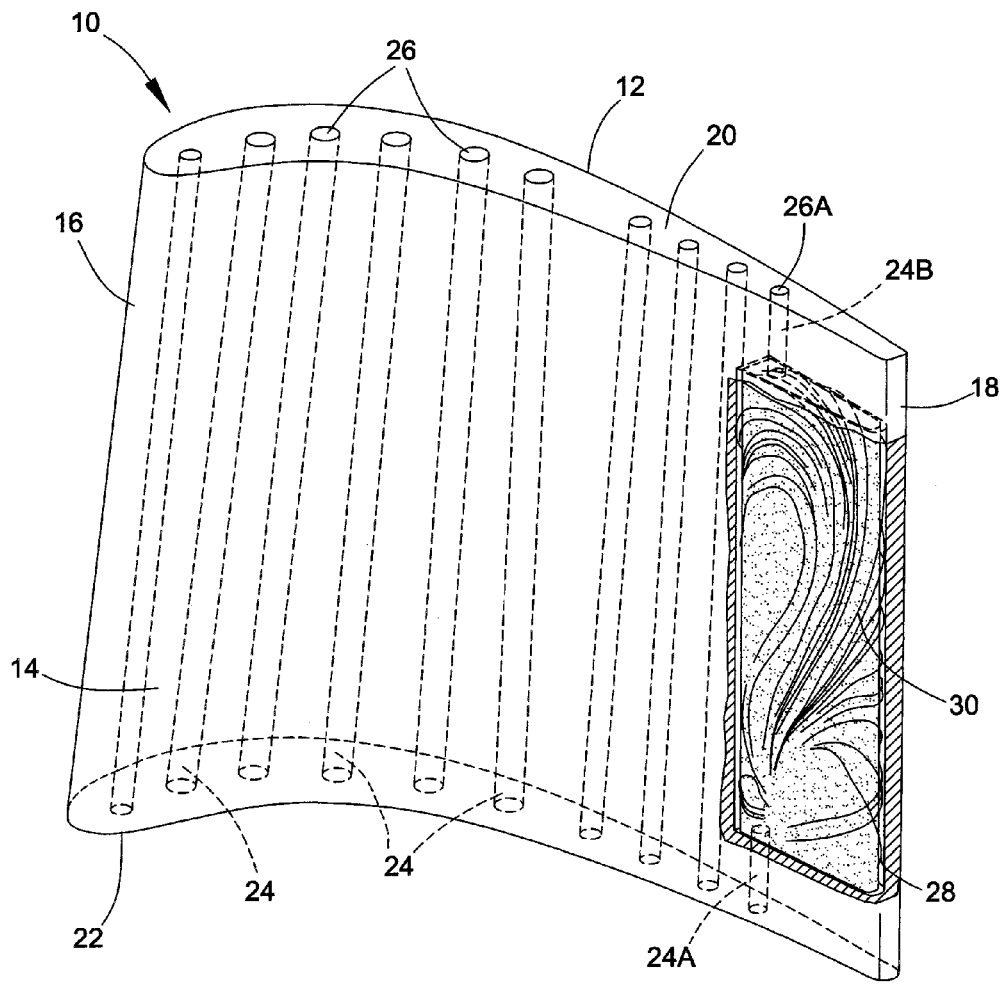
FIG. 2 represents cooling fluid flow patterns within the airfoil portion of FIG. 1.

FIG. 2 represents a computer-generated image depicting flow patterns within the chamber 28 and through the foam member 30. Notably, the cooling fluid entering the chamber 28 through the inlet passage 24A is largely redirected or diverted by the foam member 30 toward the center of the chamber 28, and then toward a corner of the chamber 28 that is opposite the corner of the chamber 28 adjacent the inlet passage 24A. While some of the cooling fluid proceeds to exit the chamber 28 through the outlet passage 24B, the bulk of the cooling fluid is recirculated back toward the root 22 of the airfoil portion 10, and then circulates within the corner of the chamber 28 opposite the outlet passage 24B prior to exiting the chamber 28. As such, considerable churning of the cooling fluid occurs within the chamber 28 beyond the turbulent flow conditions that are created as a result of the cooling fluid moving through the foam material 30, for example, if the cooling fluid flow was merely unidirectional through the foam material 30. From FIG. 2, it is evident that the cooling fluid flow through the foam member 30 is not unidirectional, but instead is multidirectional.

As would be expected, the cooling fluid flow pattern within the chamber 28 is influenced by the location and orientation of the inlet passage 24A and outlet passage 24B relative to the chamber 28, the shape, size and offset of the chamber 28 relative to the passages 24A and 24B, and the permeability of the foam member 30. Tradeoffs exist between heat transfer to and through the foam member 30 and the ability of cooling fluid to freely flow within the chamber 28, which depend in part on the degree of permeability of the foam member 30. Generally, open porosity within the foam member 30 is preferably at least 14 volume % to achieve adequate flow levels and preferably not more than 82 volume % to promote heat transfer, with a particularly preferred range believed to be about 45 to about 75 volume %. Particularly preferred porosities for a give application will depend on the strength and cooling effectiveness desired for the region of the airfoil portion 10 in which the foam member 30 is to be implemented. Computer models have predicted that, with the embodiment of the airfoil portion 10 represented in FIGS. 1 and 2, maximum temperatures within the trailing edge 18 can be reduced by about 200° F. (about 110° C.) in an operating environment in which the bleed air temperature is about 650 to about 900° F. (about 340 to about 480° C.) and the hot combustion gas temperature is about 2000 to about 2800° F. (about 1090 to about 1540° C.).

Figure 4:
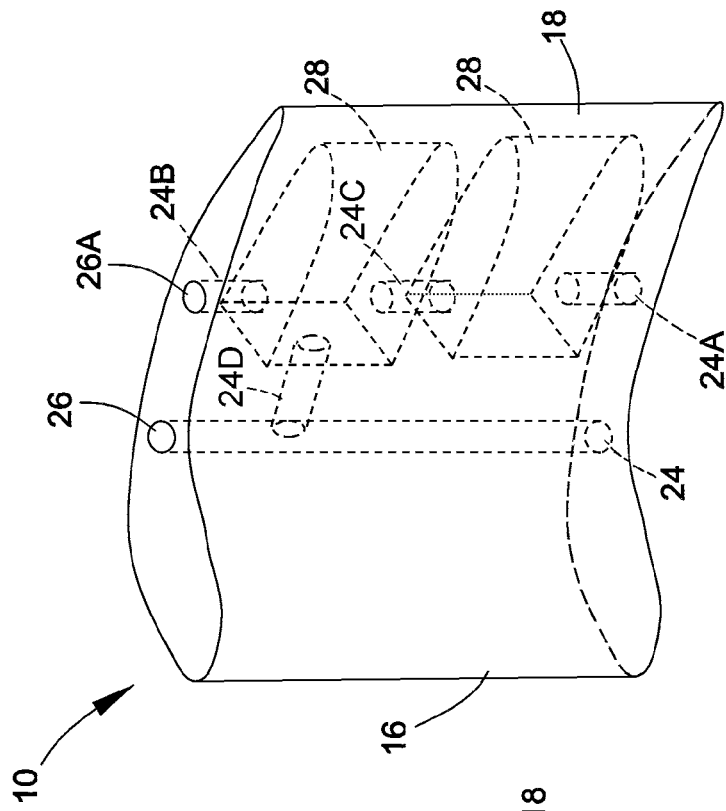
Figure 3:
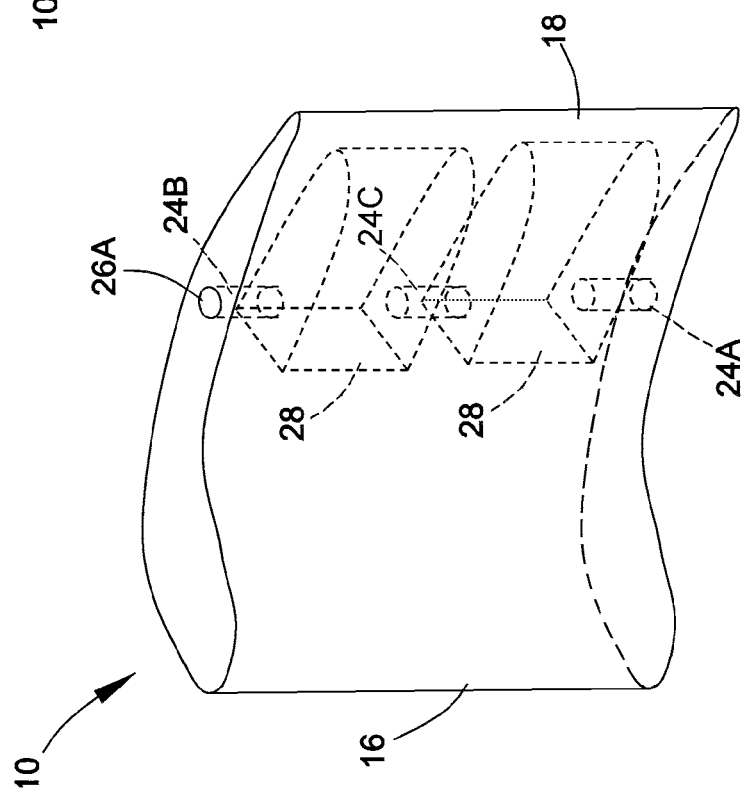

While a single chamber 28 is represented in the airfoil portion 10 of FIGS. 1 and 2, FIGS. 3 through 5 represent examples in which multiple chambers 28 can be employed and supplied cooling fluid with any number of inlet and outlet passages 24A and 24B. In FIG. 3, two chambers 28 are shown in fluidic series, interconnected by an intermediate span-wise passage 24C that is coaxial with the passages 24A and 24B. FIG. 4 shows an embodiment similar to that of FIG. 3, but with the chamber 28 nearest the airfoil tip 20 receiving supplemental cooling fluid from an adjacent passage 24 connected to the chamber 28 with a chord-wise passage 24D. Finally, FIG. 5 represents two chambers 28 in fluidic parallel, each receiving cooling fluid through a separate inlet passage 24A, and each discharging the cooling fluid through a separate outlet passage 24B and cooling hole 26A. The chambers 28 of FIG. 5 are further represented as being interconnected by a chord-wise passage 24D, allowing for balancing of the cooling flows through the chambers 28. It should be understood that various other combinations of series and parallel chambers 28 could be incorporated into an airfoil portion. Furthermore, while the chambers 28 are shown as having similar sizes and shapes (wedge-shaped), the chambers 28 could have different sizes and shapes, including irregular shapes. Finally, while it is preferred that each chamber 28 contain a porous and permeable foam member 30, it is foreseeable some but not all of the chambers 28 would contain a foam member 30.

In addition to thermal management of the airfoil portion 10 with the cooling passages 24, 24A and 24Ba, chamber(s) 28, and cooling holes 26 and 26A, the airfoil portion 10 can be further protected by coating systems as known in the art. For example, the surfaces of the airfoil portion 10 can be protected with an environmental coating or with a coating system that includes a thermal barrier coating (TBC) adhered to the airfoil portion 10 with a suitable bond coat. Typical but nonlimiting thermal barrier coating materials are ceramic materials, a notable example of which is zirconia partially or fully stabilized with yttria (YSZ) or another oxide such as magnesia, ceria, scandia and/or calcia, and optionally other oxides to reduce thermal conductivity. Suitable environmental coatings and bond coats typically have aluminum-rich compositions, for example, a diffusion aluminide coating or an overlay coating such as MCrAlX (where M is iron, cobalt and/or nickel, and X is yttrium, rare earth metals, and/or reactive metals).

While the invention has been described in terms of particular embodiments, it is apparent that other forms could be adopted by one skilled in the art. Therefore, the scope of the invention is to be limited only by the following claims.

The invention claimed is:

1. A fluid-cooled turbomachine airfoil component adapted for use in a hot gas path of a turbomachine, the airfoil component comprising:
   an airfoil portion having a span-wise direction delimited by an airfoil root and an airfoil tip, a chord-wise direction delimited by a leading edge and a trailing edge, and a thickness-wise direction delimited by concave and convex surfaces formed by walls that extend between the leading and trailing edges;
   a chamber within the airfoil portion;
   a first passage within the airfoil portion and adapted to fluidically connect the chamber to the airfoil root and a cooling fluid that enters the airfoil portion through the airfoil root;
   a second passage within the airfoil portion between the chamber and the airfoil tip thereof and adapted to fluidically connect the chamber to a first cooling hole located at a surface of the airfoil portion; and a porous and permeable foam member within the chamber;

wherein the chamber is located relative to the first and second passages so as to be offset in the chord-wise direction toward the trailing edge of the airfoil portion so that the chamber is closer to the trailing edge than the first and second passages and the cooling fluid entering the airfoil portion through the first passage enters the chamber and is diverted by the foam member in the chord-wise direction toward the trailing edge before recirculating in the chord-wise direction toward the leading edge and exiting the airfoil portion through the first cooling hole.

2. The fluid-cooled turbomachine airfoil component according to claim 1, wherein the first cooling hole is disposed at the airfoil tip of the airfoil portion.

3. The fluid-cooled turbomachine airfoil component according to claim 1, wherein the first and second passages and the chamber define a continuous cooling fluid flow passage that extends from the airfoil root to the airfoil tip of the airfoil portion.

4. The fluid-cooled turbomachine airfoil component according to claim 1, wherein the first and second passages are coaxially aligned.

5. The fluid-cooled turbomachine airfoil component according to claim 1, wherein the chamber is fluidically coupled to only the first and second passages within the airfoil portion.

6. The fluid-cooled turbomachine airfoil component according to claim 1, wherein the chamber is closer to the trailing edge than to the leading edge of the airfoil portion.

7. The fluid-cooled turbomachine airfoil component according to claim 1, wherein the chamber is a first chamber within the airfoil portion, and the airfoil component further comprises a second chamber that is within the airfoil portion and contains a second porous and permeable foam member, and the first and second chambers are fluidically in series or in parallel to each other.

8. The fluid-cooled turbomachine airfoil component according to claim 1, wherein the chamber is fluidically connected to an additional passage that is fluidically connected to the cooling fluid source and to an additional cooling hole at the airfoil tip, or is fluidically connected to a second chamber that is within the airfoil portion and contains a second porous and permeable foam member.

9. The fluid-cooled turbomachine airfoil component according to claim 1, further comprising a plurality of additional passages within the airfoil portion and a plurality of additional cooling holes located at at least one surface of the airfoil portion, the additional passages fluidically connecting the cooling fluid source to the additional cooling holes.

10. The fluid-cooled turbomachine airfoil component according to claim 9, wherein the first and second passages are closer to the trailing edge of the airfoil portion than are the additional passages.

11. The fluid-cooled turbomachine airfoil component according to claim 1, wherein the chamber has a length in the span-wise direction, a width in the chord-wise direction, and a thickness in the thickness-wise direction, and the width of the chamber is greater than widths of the first and second passages in the chord-wise direction.

12. The fluid-cooled turbomachine airfoil component according to claim 11, wherein the first passage is fluidically connected to the chamber at a first span-wise extent of the chamber closest to the airfoil root and the second passage is fluidically connected to the chamber at a second span-wise extent of the chamber closest to the airfoil tip.

13. The fluid-cooled turbomachine airfoil component according to claim 11, wherein the chamber spans about 15 to about 75 percent of a distance between the airfoil root and the airfoil tip of the airfoil portion.

14. The fluid-cooled turbomachine airfoil component according to claim 1, wherein the foam member has an open porosity of about 45 to about 75 volume percent.

15. The fluid-cooled turbomachine airfoil component according to claim 1, wherein the foam member completely fills the chamber.

16. The fluid-cooled turbomachine airfoil component according to claim 1, wherein the airfoil component is a turbine blade or bucket and the turbomachine is an industrial or aircraft gas turbine engine.

17. A fluid-cooled turbomachine airfoil component adapted for use in a hot gas path of a turbomachine, the airfoil component comprising:

an airfoil portion having a span-wise direction delimited by an airfoil root and an airfoil tip, a chord-wise direction delimited by a leading edge and a trailing edge, and a thickness-wise direction delimited by concave and convex surfaces formed by walls that extend between the leading and trailing edges;

a chamber within the airfoil portion;

a first passage within the airfoil portion and adapted to fluidically connect the chamber to a cooling fluid;

a second passage within the airfoil portion and adapted to fluidically connect the chamber to a first cooling hole located at a surface of the airfoil portion; and a porous and permeable foam member within the chamber;

wherein the first and second passages are coaxially aligned and connected to the chamber so that the cooling fluid entering the airfoil portion through the first passage enters the chamber and is diverted by the foam member in the chord-wise direction toward the trailing edge before flowing in the chord-wise direction toward the leading edge and exiting the airfoil portion through the second passage and the first cooling hole.

18. An air-cooled bucket adapted for use in a hot gas path of a gas turbine engine, the bucket comprising:

an airfoil portion having a span-wise direction delimited by an airfoil root and an airfoil tip, a chord-wise direction delimited by a leading edge and a trailing edge, and a thickness-wise direction delimited by concave and convex surfaces formed by walls that extend between the leading and trailing edges;

a chamber within the airfoil portion and located closer to the trailing edge than to the leading edge of the airfoil portion, the chamber having a length in the span-wise direction, a width in the chord-wise direction, and a thickness in the thickness-wise direction;

a first passage within the airfoil portion and adapted to fluidically connect the chamber to an air source, the first passage being fluidically connected to the chamber at a first span-wise extent of the chamber closest to the airfoil root;

a second passage within the airfoil portion and adapted to fluidically connect the chamber to a first cooling hole located at a surface of the airfoil portion, the second passage being fluidically connected to the chamber at a second span-wise extent of the chamber closest to the airfoil tip;

a porous and permeable foam member within and completely filling the chamber; and a plurality of additional passages within the airfoil portion and a plurality of additional cooling holes located at the surface of the airfoil portion, the additional passages fluidically connecting the air source to the additional cooling holes;

wherein the first and second passages are closer to the trailing edge of the airfoil portion than are the additional passages, the width of the chamber is greater than widths of the first and second passages in the chord-wise direction, and the chamber is offset from the first and second passages toward the trailing edge of the airfoil portion so that air entering the airfoil portion through the first passage enters the chamber and is diverted by the foam member toward the trailing edge before exiting the airfoil portion through the first cooling hole.

19. The air-cooled bucket according to claim 18, wherein the chamber is a first chamber within the airfoil portion, and the airfoil component further comprises a second chamber that is within the airfoil portion and contains a second porous and permeable foam member, and the first and second chambers are fluidically in series or in parallel to each other.

20. The air-cooled bucket according to claim 18, wherein the chamber is fluidically connected to an additional passage that is fluidically connected to the cooling fluid source and to an additional cooling hole at the airfoil tip, or is fluidically connected to a second chamber that is within the airfoil portion and contains a second porous and permeable foam member.

* * * * *